UNITED STATES PATENT OFFICE.

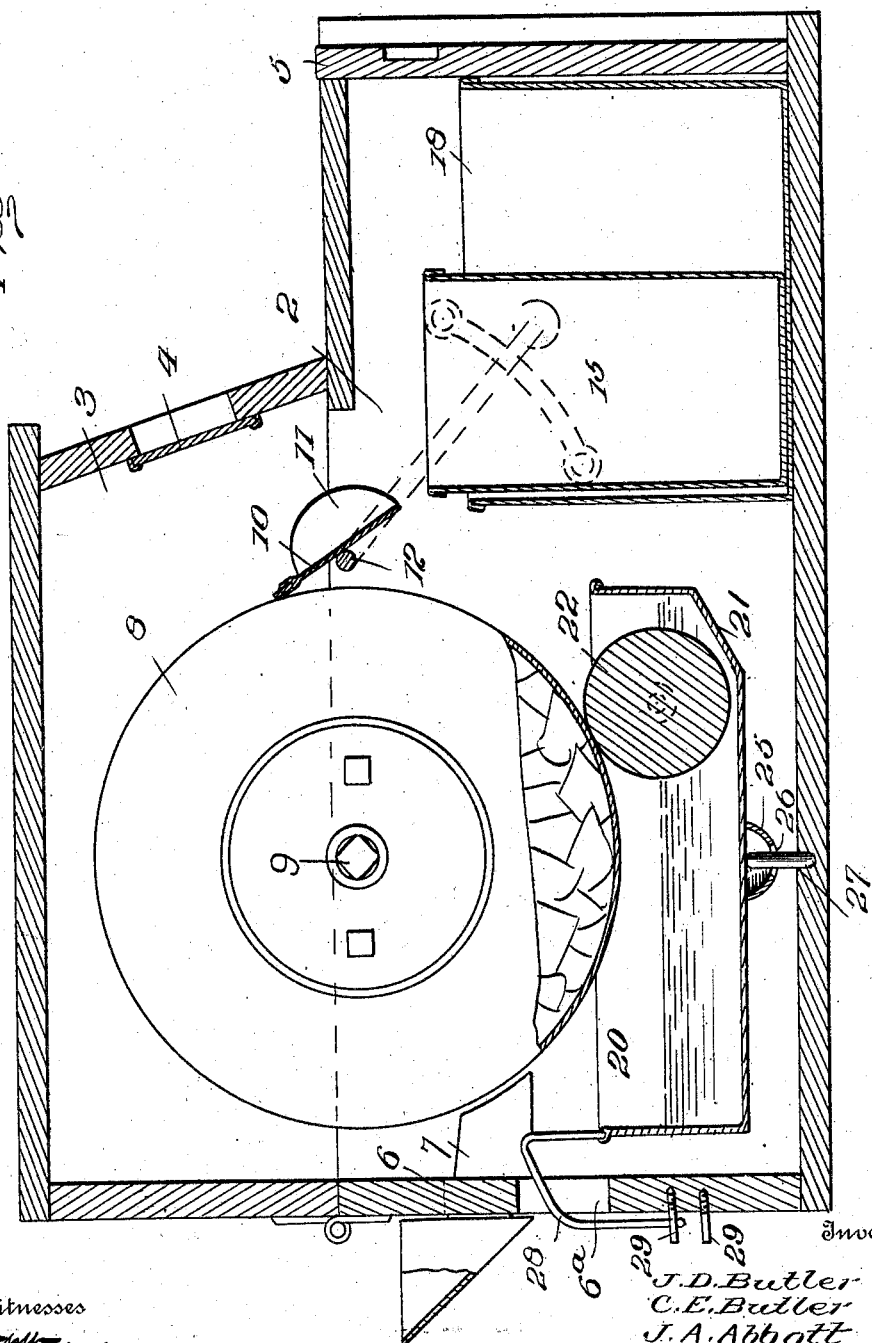

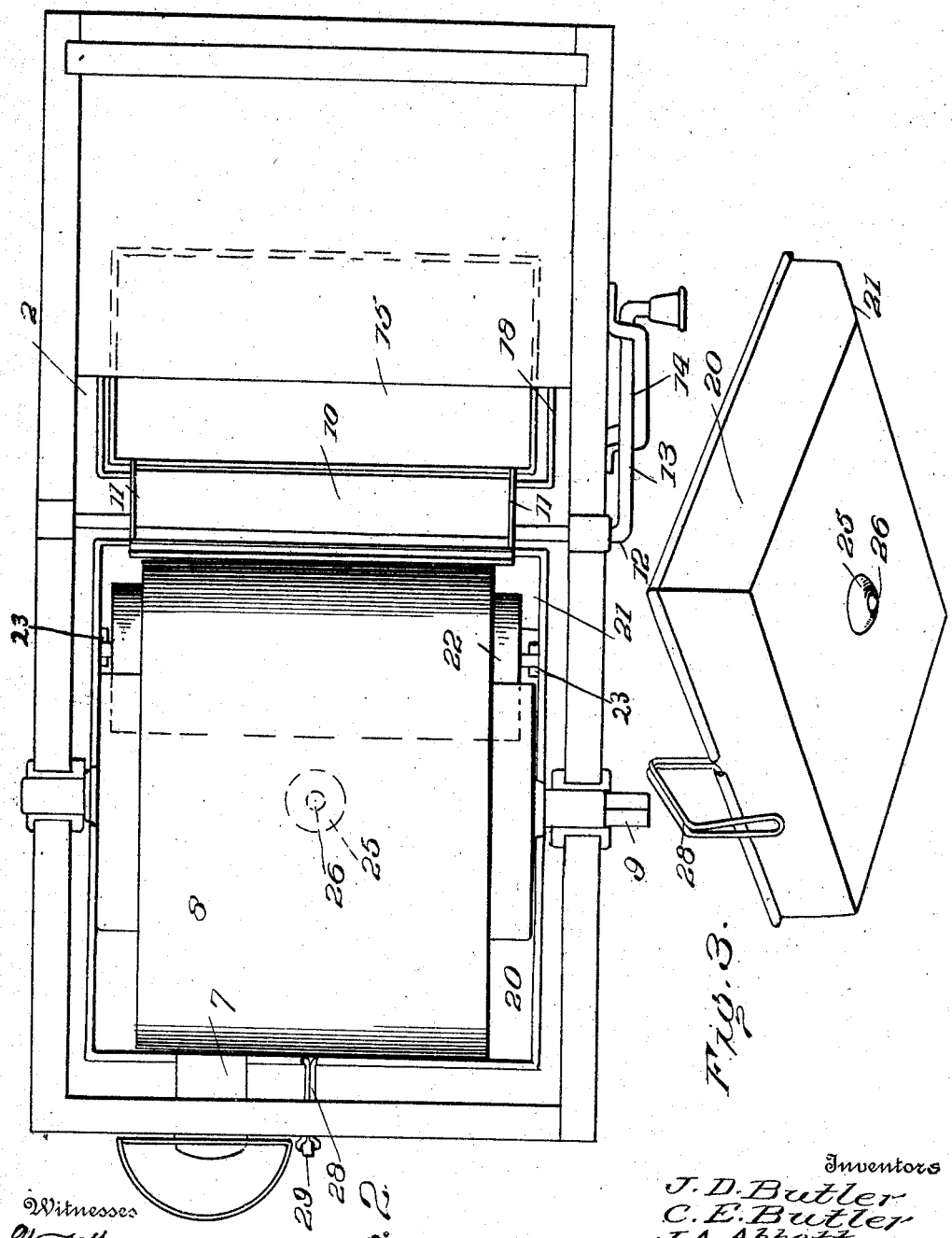

JAMES D. BUTLER, CHARLES E. BUTLER, AND JULIAN A. ABBOTT, OF OMAHA, NEBRASKA.

ICE-CREAM FREEZER.

981,060. Specification of Letters Patent. Patented Jan. 10, 1911.

Application filed December 2, 1909. Serial No. 531,039.

*To all whom it may concern:*

Be it known that we, JAMES D. BUTLER, CHARLES E. BUTLER, and JULIAN A. ABBOTT, citizens of the United States, residing at Omaha, in the county of Douglas and State of Nebraska, have invented certain new and useful Improvements in Ice-Cream Freezers, of which the following is a specification.

Our invention has for its object certain improvements in that class of ice cream freezers which consist of a horizontal rotatable cylinder containing the freezing agent, in combination with a cream-receiving pan, feeding rollers, and a scraper to remove the ice cream as made into a receptacle.

Our invention particularly relates to improvements in means for tilting the cream-holding pan so that the cream-applying roller thereon may be brought into contact with the surface of the freezing cylinder or removed therefrom, thus permitting the cream to be applied to the freezing cylinder, or not applied, as desired, and also permitting the regulation of the pressure with which the applying roller is forced against the freezing cylinder.

For a full understanding of the invention and the merits thereof, and to acquire a knowledge of the details of construction, reference is to be had to the following description and accompanying drawings, in which:

Figure 1 is a longitudinal vertical section through the freezer, the cream tray and the receiving can, the freezing cylinder being shown in elevation; Fig. 2 is a plan view of Fig. 1; and, Fig. 3 is a detail perspective view of the cream pan.

Corresponding and like parts are referred to in the following description and indicated in all the views of the drawings by the same reference characters.

Referring to these figures, 2 designates a box or casing of any desired size and having the covering section 3 which is preferably shorter than the box 2 and is provided in its forward end with the pane 4 whereby the condition of the frozen cream upon the surface of the freezer may be observed. The forward end of the box is provided with the removable door 5. The rear end of the box is provided with an opening 6 for the reception of a filling spout 7, and is also provided with the opening 6ª through which projects the means for adjusting the pan, as will be later described.

Mounted in trunnions in the upper edge of the box 2 is the freezing cylinder 8. This cylinder may be constructed in any suitable manner, and as these cylinders are well known, we have not deemed it necessary to describe the construction specifically. Suffice it to say that this freezing cylinder is adapted to hold a freezing mixture such as salt and ice. One of the trunnions of the cylinder is provided with a crank head 9 whereby the freezing cylinder may be rotated.

Mounted in front of the freezing cylinder is the scraper 10 which may be of any suitable construction, which is preferably made with the opposed wings 11, and is mounted upon the transverse rocking bar 12 which projects out through the side of the box and is there provided with the crank handle 13 whereby the scraper may be turned with more or less force against the outer surface of the freezing cylinder. The crank arm is held in place by engagement with the teeth of an arcuate rack 14.

The scraper discharges into a receiving vessel 15 which is supported in an outer can 18 adapted to hold a freezing mixture.

Carried upon the bottom of the box 2 and rearward of the freezing can 18 is the cream pan 20 which has approximately the width of the box 2 and has the forward margin of its bottom upwardly inclined, as at 21, relatively to the main portion of the bottom, so that the pan when filled with cream and having therein the applying roller 22, will normally rest upon this marginal portion 21. Carried within the forward end of the pan 20 is the wooden cream-applying roller 22 having projecting gudgeons which are received in bearing sockets 23 formed on the inside face of the sides of the pan. This roller 22 is mounted so as to freely revolve in the pan when it is brought in contact with the surface of the freezing cylinder 8.

In order to provide a fulcrum upon which the pan may rock so that the roller 22 may be raised against the freezing cylinder or lowered therefrom, we attach to the bottom of the pan the concavo-convex plate 25 which is preferably soldered to the bottom of the pan and has the central opening 26. Projecting upwardly from the bottom of the box is a pin 27 which is adapted to be inserted in the opening 26 so that when the pan is lowered into place in the bottom of the box 2, the pin 27 will project up from the opening 26 and contact with the bottom of the cream pan, thus forming the fulcrum upon which the pan will freely rock. It will be seen that this fulcrum not only permits the cream pan to rock in a plane extending longitudinally of the freezer, but also permits the pan to rock laterally. It will also be seen that this forms an extremely cheap manner of manufacturing the fulcrum for the pan 22,—one which may be readily kept clean, and a fulcrum of extreme simplicity, and that when the pan is placed with the pin projecting up into the socket formed by the plate 25, the pan cannot slip from its position.

Projecting from the rear edge of the pan is the slightly resilient hook-shaped loop 28 which projects out through the opening 8 in the rear end of the box 2 and is adapted to be engaged with any one of a plurality of pins or projections 29 which extend from the rear wall. By engaging the loop 28 with one or the other of these projections, it will be obvious that the roller 22 will be brought with more or less force against the face of the freezing cylinder. It is also to be noted that because of the fact that the pin-like fulcrum permits the cream pan to rock laterally, the roller will be adjusted so as to contact with the freezing cylinder across its entire face. Thus there is no chance of one portion of the roller contacting with the cylinder while the other portion is separated therefrom. This is obviously a very important point in the effective use of this form of ice cream freezer. It is to be remembered that the pan 22 is usually of tin or other like metal which is very liable to become bent in use, and which has a certain degree of flexibility, and that thus some means should be provided for permitting the pan to tilt laterally as well as forwardly and rearwardly to bring this roller into contact with the freezing cylinder along its entire face, as above described.

The operation of our machine is evident.

The pan 20 is to be filled with cream and placed upon the bottom of the casing 2. The wooden roller at the forward end of the pan and the cream in the pan tend to lift the rear end of the pan so that the roller 22 is out of contact with the freezing cylinder. The receptacle 15 is now put in place, the freezing cylinder lowered into position, and the top of the casing closed. By drawing downward upon the loop 28, the rear end of the cream pan will be lowered and the roller 22 brought in contact with the face of the freezing cylinder. By now rotating the freezing cylinder, a thin film of cream will be applied thereto from the roller 22, and will be frozen upon the face of the cylinder. When the frozen cream has reached a proper thickness, the scraper is moved into more or less close contact with the face of the freezing cylinder, and the further rotation of the cylinder will scrape the frozen cream into the receptacle 15.

The advantages of our improvements particularly lie in the cheapening of the construction; the greater simplicity of the several parts, and particularly in the fact that, as before stated, the roller will contact with the face of the freezing cylinder along its whole extent when the cream pan is forced downward at its rear end, due to the peculiar form of support used.

Another important advantage gained by the use of the wire loop 28 is that the loop is so shaped as to be elastically yielding or resilient, and hence the roller 22 is allowed to run smoothly over the cylinder 8, even though the cylinder be not exactly round, or the surface thereof be not exactly even. The devices previously used for the purpose of holding the roller 22 to the freezing cylinder have been so rigid as to hold the roller against the cylinder with more or less rigidity, and hence the cream has not been applied evenly to the surface of the cylinder.

Having thus described the invention, what is claimed as new is:—

1. In an ice cream freezer of the character described, an outer casing having a bottom, a rocking tray having a cream-applying roller at its forward end, the bottom of the outer casing being provided with an upwardly projecting pin circumferentially rounded at its upper end and the tray having a socket on its under side into which the pin loosely extends, said socket being so formed as to permit the socket to have any angular relation to the pin.

2. In an ice-cream freezer of the character described, an outer casing, a cream tray located within the casing and movable therein, a pin having a rounded upper end projecting upward from the bottom of the casing and forming the fulcrum for the tray, and a hemispherical hollow shell attached to the bottom of the tray and forming a socket into which the rounded end of the pin projects.

3. In an ice-cream freezer of the character described, the combination with an outer casing having an opening in its rear end, of a cream tray within the casing having rocking engagement with the bottom of the casing, said tray having a loop extending out through the opening in the rear end of the casing whereby the front end of the tray may be raised, a plurality of rearwardly projecting studs on the casing with which said loop engages, and a cream-applying roller on the front end of the cream tray.

4. In an ice cream freezer, an outer casing, a rotary freezing cylinder mounted in the casing, a cream tray located below the freezing cylinder, said tray having a downwardly projecting pin forming a fulcrum for the tray and engaging with the bottom of the casing, the rear end of the tray being formed with a hook-shaped loop extending out from the opening in the rear end of the casing, and a projection on the rear end of the casing with which said hook-shaped loop engages to hold the tray with its forward end raised and its roller in engagement with the freezing cylinder.

In testimony whereof we affix our signatures in presence of two witnesses.

JAMES D. BUTLER. [L. S.]
CHARLES E. BUTLER. [L. S.]
JULIAN A. ABBOTT. [L. S.]

Witnesses:
CHAS. I. ROWE,
H. W. THOMPSON.